US009479537B2

(12) United States Patent
Zhao et al.

(10) Patent No.: US 9,479,537 B2
(45) Date of Patent: Oct. 25, 2016

(54) METHOD, SYSTEM AND APPARATUS FOR IMPROVING SECURITY LEVEL OF A TERMINAL WHEN SURFING INTERNET

(71) Applicant: TENCENT TECHNOLOGY (SHENZHEN) COMPANY LIMITED, Shenzhen (CN)

(72) Inventors: Feng Zhao, Shenzhen (CN); Fei Qi, Shenzhen (CN); Dan Song, Shenzhen (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 49 days.

(21) Appl. No.: 13/832,596

(22) Filed: Mar. 15, 2013

(65) Prior Publication Data

US 2013/0212639 A1 Aug. 15, 2013

Related U.S. Application Data

(63) Continuation of application No. PCT/CN2012/070393, filed on Jan. 16, 2012.

(30) Foreign Application Priority Data

Feb. 23, 2011 (CN) .......................... 2011 1 0046003

(51) Int. Cl.
*G06F 17/00* (2006.01)
*H04L 29/06* (2006.01)
(Continued)

(52) U.S. Cl.
CPC ............ *H04L 63/20* (2013.01); *G06F 21/567* (2013.01); *G06F 21/577* (2013.01);
(Continued)

(58) Field of Classification Search
CPC ... H04L 63/12; H04L 63/123; H04L 63/126; H04L 63/14–63/1425; H04L 63/1483; G06F 21/56; G06F 21/00; G06F 21/128; G06F 21/561–21/565; G06F 21/567; G06F 2221/2119

USPC ............. 726/1, 22–24, 27, 30; 713/187, 188
See application file for complete search history.

(56) References Cited

U.S. PATENT DOCUMENTS 7,310,817 B2 * 12/2007 Hinchliffe ............ G06F 21/567
709/223
7,814,070 B1 * 10/2010 Kaminski, Jr. ... G06F 17/30864
707/687

(Continued)

FOREIGN PATENT DOCUMENTS

CN 101127633 A 2/2008
CN 101783803 A 7/2010

(Continued)

OTHER PUBLICATIONS

Written Opinion of the International Searching Authority for PCT/CN2012/070393 (in Chinese with English Translation), mailed May 3, 2012; ISA/CN.

(Continued)

*Primary Examiner* — Daniel Potratz
(74) *Attorney, Agent, or Firm* — Harness, Dickey & Pierce, P.L.C.

(57) ABSTRACT

A method, system, and apparatus for improving security level of a terminal when it surfs the Internet. The method includes receiving, by a network side, network security information reported by a terminal, generating a network security policy according to the network security information reported by each terminal, and transmitting a security indication to the network security policy to the terminal; providing, by the terminal, a security prompt for network information to be obtained or having been obtained according to the security indication. Various embodiments can improve the security level of the terminal when it surfs the Internet and save resources of the terminal.

10 Claims, 8 Drawing Sheets

(51) Int. Cl.
   *G06F 21/56*      (2013.01)
   *G06F 21/57*      (2013.01)
   *H04L 29/08*      (2006.01)

(52) U.S. Cl.
   CPC ............. *G06F 2221/2115* (2013.01); *G06F 2221/2119* (2013.01); *H04L 63/14* (2013.01); *H04L 63/1483* (2013.01); *H04L 67/02* (2013.01)

(56) References Cited

U.S. PATENT DOCUMENTS

| | | | | |
|---|---|---|---|---|
| 2008/0141342 | A1* | 6/2008 | Curnyn | H04L 63/0227 726/3 |
| 2009/0287653 | A1* | 11/2009 | Bennett | H04L 63/145 |
| 2010/0186088 | A1* | 7/2010 | Banerjee | G06F 21/51 726/23 |
| 2011/0047594 | A1* | 2/2011 | Mahaffey | G06F 21/564 726/1 |
| 2013/0247179 | A1* | 9/2013 | Chandran et al. | 726/22 |

FOREIGN PATENT DOCUMENTS

| | | | | |
|---|---|---|---|---|
| CN | 101827365 A | 9/2010 | | |
| EP | 2009865 A1 | 12/2008 | | |
| WO | WO 2010097605 A1 * | 9/2010 | | H04L 9/08 |

OTHER PUBLICATIONS

International Search Report for International Patent Application No. PCT/CN2012/070393, dated May 3, 2012, and English translation thereof.

* cited by examiner

METHOD, SYSTEM AND APPARATUS FOR IMPROVING SECURITY LEVEL OF A TERMINAL WHEN SURFING INTERNET

CROSS-REFERENCE TO RELATED APPLICATIONS

This application is a continuation of International Application No. PCT/CN2012/070393, filed on Jan. 16, 2012. This application claims the benefit and priority of Chinese Patent Application No. 201110046003.5, filed Feb. 23, 2011. The entire disclosures of each of the above applications are incorporated herein by reference.

FIELD

The present disclosure relates to communications techniques and to a method, system and apparatus for improving security level of a terminal during Internet surfing.

BACKGROUND

This section provides background information related to the present disclosure which is not necessarily prior art.

With the development of mobile Internet techniques, mobile terminals may surf the Internet via browsers of the mobile terminals to obtain network information. In particular, a browser of the mobile terminal transmits a network information obtaining request to a Web/WAP server, parses network information such as hypertext information and/or multimedia data transmitted by the Web/WAP server, and displays and/or plays the parsed result.

Mobile Internet techniques provide users with more convenient information obtaining methods but bring many security problems existing in conventional Internet to the mobile terminals at the same time, e.g., domain-name inputting trap, malicious phishing websites, malicious plug-ins, charge absorbing applications. Therefore, it is urgent to construct a safe and reliable mobile network environment with sense of belonging for users.

Unsafe factors such as malicious phishing websites and domain-name inputting traps make users less secure when browsing webpages. Currently, there is no solution for improving security level of mobile terminals when browsing webpages.

As to security checking of files downloaded by the users, conventional systems store a virus library in the mobile terminal. The downloaded file is scanned according to the locally stored virus library to improve the security level of the mobile terminal when downloading the file.

The locally stored virus library occupies a large quantity of space in the mobile terminal. In addition, updating the virus library consumes considerable traffic capacity of the mobile terminal. On the other hand, the virus library has an update period. Therefore, it cannot ensure that the locally stored virus library is the newest during the update period. Thus, the security level of the mobile terminal when downloading files is low.

SUMMARY

This section provides a general summary of the disclosure, and is not a comprehensive disclosure of its full scope or all of its features.

Various embodiments provide a method, system and apparatus for improving security level of a mobile terminal when surfing the Internet, so as to improve security level of the mobile terminal when surfing the Internet and save resources of the mobile terminal.

Various embodiments include a method for improving security level of a mobile terminal when surfing the Internet, including:

receiving, by a network side, network security information reported by a terminal, generating a network security policy according to the network security information reported by each terminal, and transmitting a security indication according to the network security policy to the terminal; and providing, by the terminal, a security prompt for network information to be obtained or having been obtained according to the security indication.

A system for improving security level of a mobile terminal when surfing the Internet, including a security server and a terminal, wherein the security server is adapted to receive network security information reported by the terminal, generate a network security policy according to the network security information reported by each terminal, and transmit a security indication to the terminal according to the network security policy; and the terminal is adapted to receive the security indication transmitted by the security server, provide a security prompt for network information to be obtained or having been obtained according to the security indication.

A terminal, including a reporting module and a security prompting module; wherein the reporting module is adapted to report network security information to a security server; and the security prompting module is adapted to receive a security indication returned by the security server, and provide a security prompt for network information to be obtained or having been obtained according to the security indication.

A security server, including an obtaining module, an analyzing module, a storage module and a transmitting module; wherein the obtaining module is adapted to obtain network security information reported by each terminal;

the analyzing module is adapted to analyze the information obtained by the obtaining module, and generate a network security policy according to an analyzed result;

the storage module is adapted to store the network security policy; and the transmitting module is adapted to transmit a security indication to the terminal according to the network security policy.

In view of the above technical solution, in various embodiments, the terminal reports the network security information to the network side. The network side generates a network security policy according to the network security information reported by the terminal. According to the network security policy, the network side transmits a security indication to the terminal. The terminal provides a security prompt for network information to be obtained or having been obtained according to the security indication. Since network security information used for generating the network security policy may be reported by a plurality of terminals, the security server and the plurality of terminals form a cloud security architecture, which is able to improve the reliability and real-time performance of the network security policy. The terminal provides security prompt for the network information to be obtained or having been obtained according to the security indication which is obtained according to the network security policy. Thus, the security level of the terminal when surfing the Internet is improved.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

Hereinafter, the present disclosure will be described in further detail with reference to accompanying drawings and examples to make the technical solution and merits therein clearer.

Figure 1:
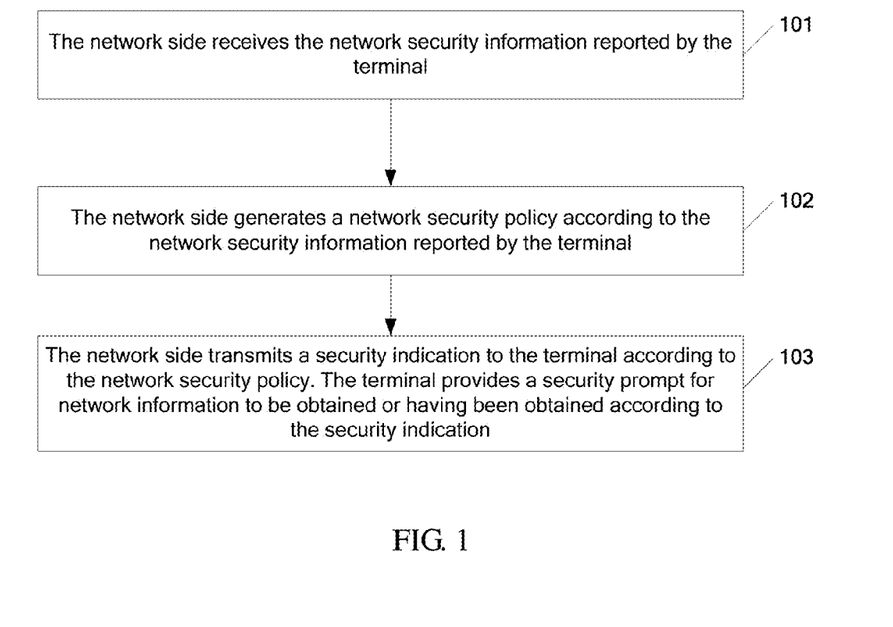
FIG. 1 is a flowchart illustrating a method for improving security level of a terminal when surfing the Internet according to various embodiments.

FIG. 1 is a flowchart illustrating a method for improving security level of a terminal when surfing the Internet according to various embodiments.

With reference to FIG. 1, at block 101, a network side receives network security information reported by a terminal. Besides obtaining the network security information from the terminal, the network side may also obtain the network security information according to one of the following two manners: obtaining visiting information of a website and/or file downloading information, storing security list information of the website and file characteristic code. The network security information includes but is not limited to: information indicating whether the website is safe and characteristic code information of the file.

At block 102, the network side generates a network security policy according to the network security information reported by the terminal. Through analyzing the network security information reported by the terminal, the visiting information of the website and/or file downloading information, the security list information of the website and the file characteristic code, the network security policy may be generated. The network security policy is used for determining whether network information to be obtained or network information having been obtained is safe. For example, the network security policy may include but is not limited to: a white list of safe websites and/or a black list of unsafe websites, a characteristic code list of unsafe files and/or a characteristic code list of safe files, etc.

At block 103, the network side transmits a security indication to the terminal according to the network security policy, the terminal provides a security prompt for the network information to be obtained or the network information having been obtained according to the security indication.

The method as shown in FIG. 1 may provide a secure browsing service to the terminal and may also provide a secure downloading service to the terminal. The terminal may be a mobile terminal, e.g., cell phone, personal digital assistant (PDA), car mobile device, etc. The terminal may also be a personal computer (PC). Hereinafter, the mobile terminal is used as a non-limiting example to describe the method for providing the secure browsing service and the secure downloading service in detail. The method is also applicable to other terminals such as PDA, car mobile device and PC.

The solution for providing the secure browsing service to a terminal is as follows.

The network side transmits the network security policy information such as the black list and/or white list to the mobile terminal. The mobile terminal performs a matching process for a website address that the browser receives and/or a website address in a link on the browser according to the black list and/or the white list. According to the matching result, a security prompt is provided. For example, if the website address matches an unsafe address in the black list, a prompt indicating that the website is unsafe is provided. If the website address matches a safe address in the white list, a prompt indicating that the website is safe is provided.

Through checking the website address according to the black list and/or white list and providing a prompt according to the checked result, a prompt indicating whether the website is safe may be provided when the user inputs the website address, which prevents the user visiting malicious websites such as phishing websites.

Figure 2:
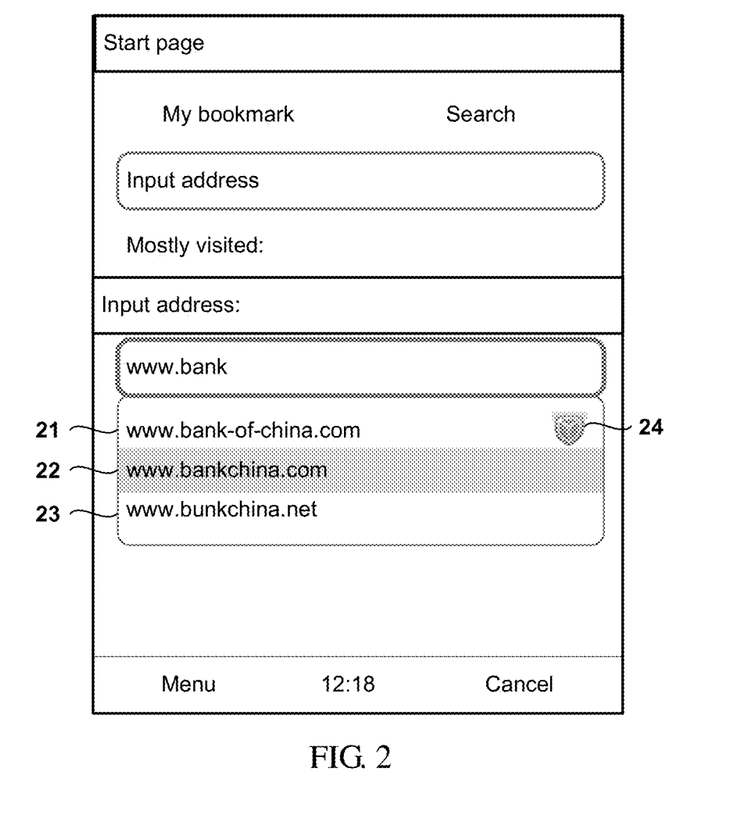
FIG. 2 is a schematic diagram showing an address inputting interface for providing a secure browsing service according to various embodiments.

FIG. 2 is a schematic diagram showing an address inputting interface for providing the secure browsing service according to an example of the present disclosure. As shown in FIG. 2, when a user inputs a website address in the browser, the mobile terminal displays locally-stored relevant addresses which are obtained through a fuzzy match according to the website address input by the user. Then, the mobile browser compares the relevant addresses with the addresses in the black list and/or the white list. If a relevant address matches the address in the white list, a safe icon is displayed. If the relevant address does not match the address in the white list, the safe icon is not displayed. For example, there are three addresses (addresses 21, 22 and 23 in FIG. 2) matching www.bank in a fuzzy manner. Among them, only www.bank-of-china.com (address 21 in FIG. 2) matches a safe address in the white list. Therefore, a shield icon (address 24 in FIG. 2) indicating that the address is safe is displayed. As to other two fuzzy matching addresses, no safe icon is displayed.

Webpages usually contain many links. Users cannot recognize whether these links are safe. In various embodiments, through comparing a link address in the webpage with addresses in the black list and/or white list and providing a prompt according to the compared result, it is possible to provide a prompt indicating whether the address is safe to the user, so as to prevent the user from clicking malicious links.

Figure 3:
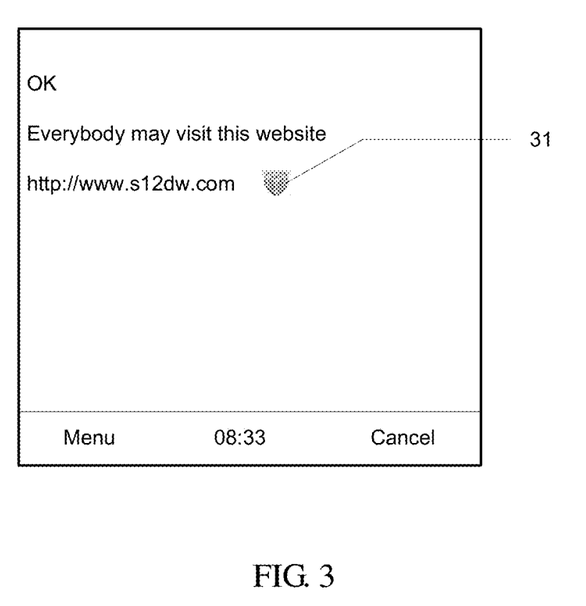
FIG. 3 is a schematic diagram showing a webpage browsing interface for providing the secure browsing service according to various embodiments.

FIG. 3 is a schematic diagram showing a webpage interface providing the secure browsing service according to various embodiments. In FIG. 3, as to a website address http://www.s12dw.com in a webpage, various embodiments compare the website address with addresses in the locally-stored black list and/or white list and determines whether a safe icon should be displayed according to a compared result. For example, if the website address matches an address in the white list, a safe icon is displayed, as shown by the shield icon 31 in FIG. 3.

The mobile terminal may synchronize the black list and/or white list with a security server when opening the browser or synchronize the black list and/or the white list periodically after opening the browser.

In order to reduce traffic amount for synchronizing the security indication such as the black list and/or the white list, the security indication such as the black list and/or white list may be updated according to an incremental manner, i.e., only changes in the black list and/or white list are obtained from the security server.

Figure 4:
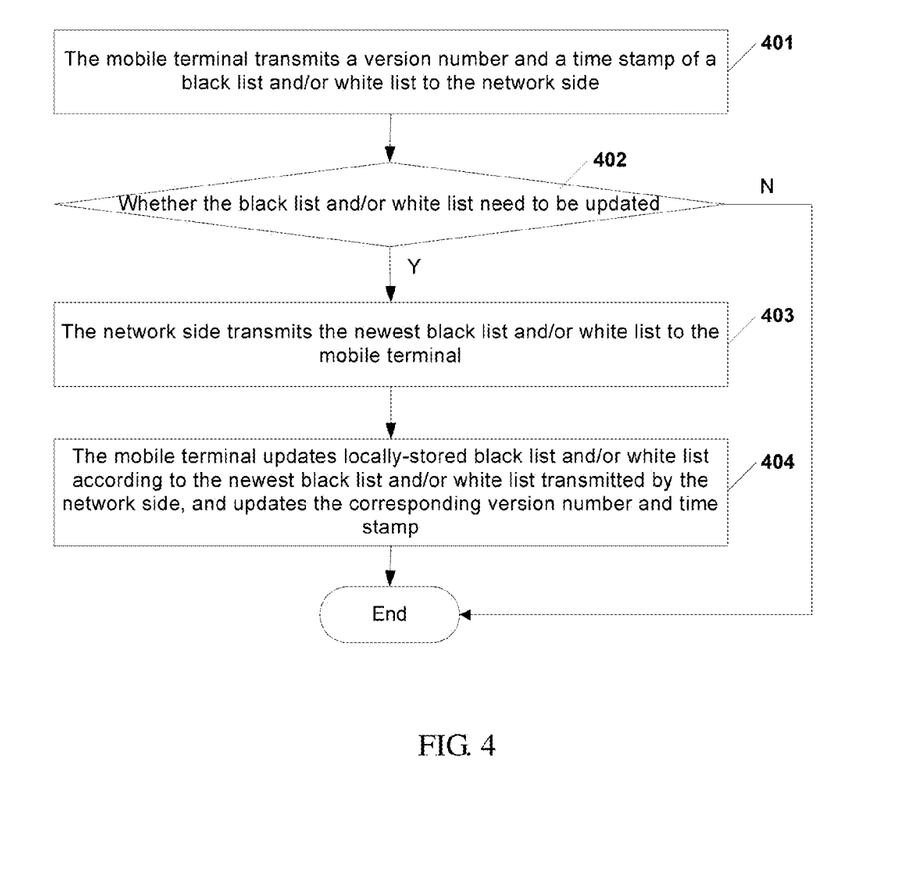
FIG. 4 is a flowchart illustrating the synchronization of a black list and/or white list by the mobile terminal according to various embodiments.

FIG. 4 is a flowchart illustrating a method for synchronizing the black list and/or white list by the mobile terminal according to according to various embodiments. As shown in FIG. 4, at block 401, the mobile terminal transmits a version number and/or a time stamp of the black list and/or white list to the network side.

At block 402, the network side determines whether the black list and/or white list need to be updated. If the black list and/or white list need to be updated, block 403 is performed; otherwise, the method ends. The network side determines whether the black list and/or white list of the mobile terminal are the newest according to the version number and/or time stamp. If the black list and/or white list of the mobile terminal are the newest, no update is required; otherwise, an update is required.

At block 403, the network side transmits the newest black list and/or white list to the mobile terminal. The network side may transmit the complete newest black list and/or white list to the mobile terminal, or transmits changes in the newest black list and/or white list compared to the black list and/or white list of the mobile terminal to the mobile terminal.

At block 404, the mobile terminal updates its black list and/or white list according to the black list and/or white list transmitted by the network side, and updates the version number and/or the time stamp. Then the method ends.

Websites may be classified. A safe list such as a black list and/or a white list may be generated for each kind of website. The safe list may include website addresses which are visited most frequently in each category, e.g., first 100 websites addresses which are visited most frequently, so as to meet a requirement of fast input and secure browsing of most users.

If the network speed is rapid enough to meet the requirement of the user, the mobile terminal may further return the address to be checked to the network side in real-time. The network side determines whether the address is safe according to a current security policy. According to a determined result, the network side transmits a security suggestion to the mobile terminal. The mobile terminal provides a security prompt to the user according to the security suggestion. The details may be as shown in FIG. 5.

Figure 5:
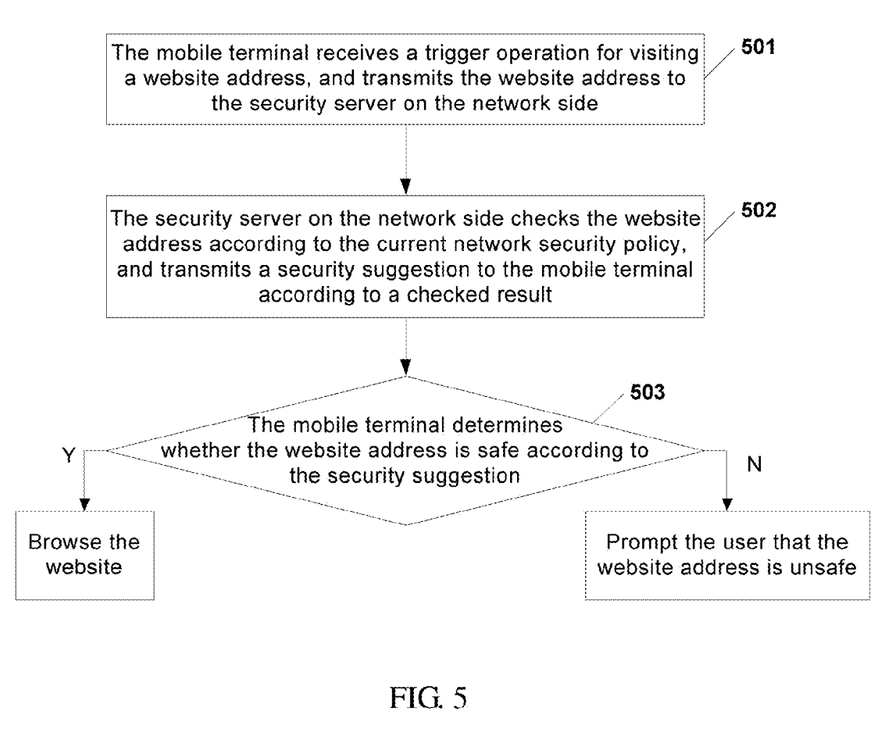
FIG. 5 is flowchart illustrating a method for providing a secure browsing service for a mobile terminal according to various embodiments.

FIG. 5 is a flowchart illustrating a method for providing a secure browsing service to a mobile terminal according to various embodiments.

As shown in FIG. 5, at block 501, the mobile terminal receives a trigger operation for opening a website address, and transmits the website address to a security server on the network side.

At block 502, the security server on the network side performs a security detection to the website address according to a current network security policy, and transmits a security suggestion to the mobile terminal according to a detected result.

At block 503, the mobile terminal determines whether the website address is safe according to the security suggestion. If the website is safe, the mobile terminal keeps on browsing the website. Otherwise, the mobile terminal prompts the user that the website is unsafe.

In various embodiments, the transmission of the website address in real-time and the locally storing of the black list and/or white list may be used together. For example, the website address to be checked is compared with the addresses in the black list and/or white list. If the website address to be checked does not match any one of the addresses in the black list and/or white list, the website address is transmitted to the security server on the network side for security check. A security prompt is given according to the security suggestion returned by the security server.

The solution for providing a secure downloading service to a mobile terminal is as follows. The mobile terminal obtains characteristic code information of a file downloaded by the mobile terminal, transmits the characteristic code information to the security server, and provides a security prompt to the user according to a security indication returned by the security server.

The network side compares the characteristic code information reported by the mobile terminal with that of safe files and/or those of unsafe files. If the compared results conflict, the network side transmits an instruction to the mobile terminal for collecting the characteristic code information again. According to the characteristic code information newly-collected by the mobile terminal, the network side performs the comparison. According to the instruction of the security server, the mobile terminal collects the characteristic code information of one file for more than two times adopting different manners.

For one non-limiting example, if the characteristic code reported by the mobile terminal matches both the characteristic code of a safe file and that of an unsafe file, the network side transmits the instruction to the mobile terminal indicating the mobile terminal to collect the characteristic code again. According to the instruction, the mobile terminal collects the characteristic code using another collecting method. For example, if the characteristic code of the beginning part, middle part and end part of the file is collected during the first time collection, the characteristic code of the beginning part, ¼ part, ½ part, ¾ part and the end part of the file may be collected this time. The network side compares the newly-collected characteristic code with those of the safe files and/or those of the unsafe files. If the compared results do not conflict, a prompt is given. Otherwise, an instruction indicating the mobile terminal to collect the characteristic code again is transmitted to the mobile terminal until the compared results do not conflict.

The algorithms adopted by the mobile terminal to collect the characteristic code may be pre-determined by the network side and the mobile terminal or indicated by the network side in the instruction indicating the mobile terminal to collect the characteristic code again.

In the above method provided by various embodiments, all the functions and protocols for security checking of the mobile terminal may be encapsulated in an independent security plug-in. The security plug-in may be updated anytime. The checking policy may be updated with little cost and rapid speed, such that the security of the mobile terminal is ensured.

All of the functions and protocols for security checking of the mobile terminal may be implemented by non-plug-in.

Figure 6:
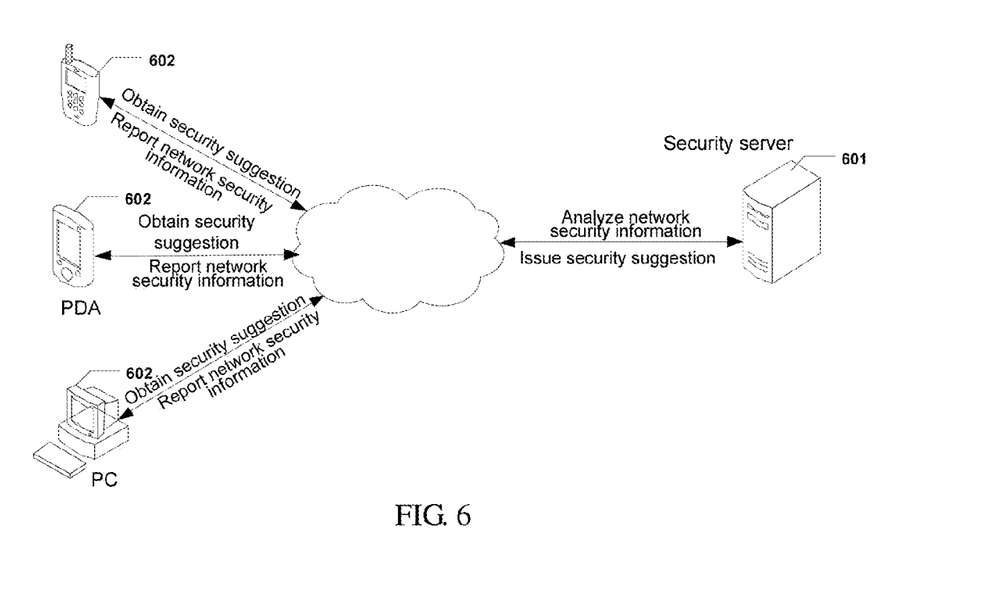
FIG. 6 is a schematic diagram illustrating a structure of a system for improving security level of a mobile terminal when surfing the Internet according to various embodiments.

Various embodiments further provide a system for improving security level of a mobile terminal when surfing the Internet, as shown in FIG. 6. FIG. 6 is a schematic diagram illustrating a system for improving security level of a mobile terminal when surfing the Internet according to various embodiments. As shown in FIG. 6, the system includes a security server 601 and a plurality of terminals 602.

In the system as shown in FIG. 6, the terminal 602 automatically or manually reports information of a website or an application or characteristic code of a file to the security server 601. The security server 601 generates security data (i.e., network security policy) through an automatic analysis of the information of the website or application or the characteristic code of the file and stores the security data in a database. When a browser of the terminal 602 visits a website or downloads a file, the terminal 602 transmits the characteristic code of the website address or the application to the security server 601. The security server 601 gives security suggestions to ensure the safety of the terminal 602. Alternatively, the security server 601 may issue a security indication such as a black list or a white list to the terminal 602 according to the security policy. The terminal 602 provides a security prompt for the website to be visited or the file having been downloaded according to the security indication.

In FIG. 6, the terminal 602 may be a mobile terminal such as cell phone, PDA, car device, or PC. Hereinafter, the system as shown in FIG. 6 is described in detail using the mobile terminal as an example terminal 602.

The security server 601 is adapted to receive network security information reported by the mobile terminal 602, generate network security policy according to the network security information reported by the mobile terminal 602, and transmit a security indication to the mobile terminal 602 according to the network security policy.

The mobile terminal 602 is adapted to receive the security indication transmitted by the security server 601, and provide a security prompt for the network information to be obtained or having been obtained according to the security indication.

The mobile terminal 602 includes a plug-in platform which includes an interface for installing a network security plug-in, wherein the network security plug-in is used for reporting the network security information to the security server 601 and providing the security prompt regarding the network information to be obtained or having been obtained according to the security indication returned by the security server 601.

The mobile terminal 602 includes a browsing module which is used for receiving a website address and browsing a webpage.

The network security plug-in is adapted to obtain the black list and/or white list of the network security information from the security server 601 and store the black list and/or white list, compare a website address received by the browsing module and/or a website address of a link in the current webpage with security information in the black list and/or white list, and display the security prompt according to the compared result.

The security server 601 includes a first module, adapted to generate the black list and/or white list according to the network security information obtained.

The network security plug-in further includes a module, adapted to transmit, if the website address to be checked does not match the security information in the black list and/or white list, the website address to be checked to the security server 601, and provide the security prompt for the network information to be obtained or having been obtained according to a checked result returned by the security server 601.

The security server 602 includes a second module, adapted to perform a security checking to the website address to be checked according to the network security policy, and transmit the checked result to the network security plug-in.

The mobile terminal 602 may further include a downloading module, adapted to download a file.

The network security plug-in is adapted to obtain characteristic code information of the file downloaded by the downloading module, transmit the characteristic code information to the security server 601, and receive the security indication from the security server 601.

The security server 601 includes a third module, adapted to receive the characteristic code information reported by the mobile terminal 602, and return the security indication to the mobile terminal 602 according to the characteristic code information.

The network security plug-in is adapted to obtain, according to the indication of the security server 601, characteristic code information of one file for more than two times using different methods.

The third module is further adapted to receive the characteristic code information reported by the mobile terminal 602, compare the characteristic code information with characteristic code of safe files and/or those of unsafe files, transmit an instruction indicating the mobile terminal to collect the characteristic code again and perform the comparison again according to the characteristic code newly-collected by the mobile terminal 602 if the compared results conflict.

The security server 601 includes an obtaining module, an analyzing module, a storage module and a transmitting module. The obtaining module is adapted to receive network security information reported by the mobile terminal 602. The analyzing module is adapted to analyze the network security information obtained by the obtaining module, and generate network security policy according to the analysis result. The storage module is adapted to store the network security policy. The transmitting module is adapted to transmit a security indication to the mobile terminal 602 according to the network security policy. The obtaining module is further adapted to obtain website visiting information and/or file downloading information, and/or store security list information of the website and the characteristic code of the file.

Figure 7:
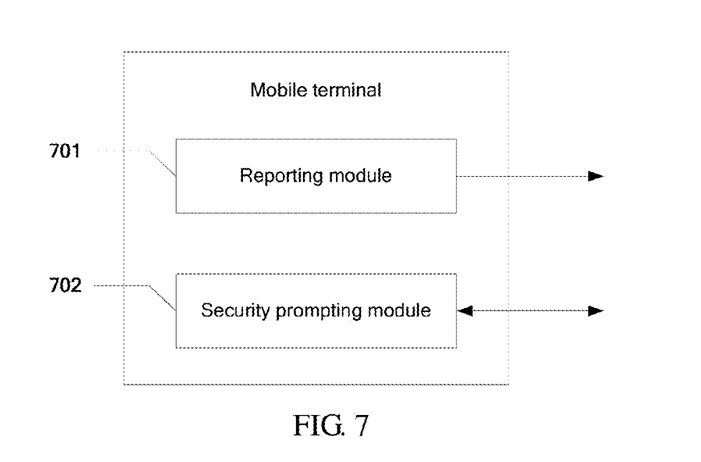
FIG. 7 is a schematic diagram illustrating a structure of a mobile terminal for improving security level of the mobile terminal when the terminal surfs the Internet according to various embodiments.

Various embodiments further provide a mobile terminal and a security server for improving security level of the mobile terminal when surfing the Internet, as shown in FIG. 7 to FIG. 10. FIG. 7 is a schematic diagram illustrating a terminal for improving security level of the terminal when the terminal surfs the Internet according to various embodiments. As shown in FIG. 7, the terminal includes a reporting module 701 and a security prompting module 702. The reporting module 701 is adapted to report network security information to a security server.

The security prompting module 702 is adapted to receive a security indication returned by the security server, and provide a security prompt for network information to be obtained or having been obtained according to the security indication.

The terminal includes a plug-in platform which includes an interface for installing the network security plug-in, wherein the network security plug-in includes the reporting module 701 and the security prompting module 702.

The security prompting module 702 is adapted to obtain black list and/or white list of network security information from the security server and store the black list and/or white list, compare a website address received by the browsing module and/or a website address of a link in the current webpage with security information in the black list and/or white list, and display the security prompt according to the compared result.

The security prompting module 702 further includes a module, adapted to transmit, if website address to be checked does not match the security information in the black list and/or white list, the website address to be checked to the security server, and provide the security prompt for the network information to be obtained or having been obtained according to a checked result returned by the security server.

Figure 8:
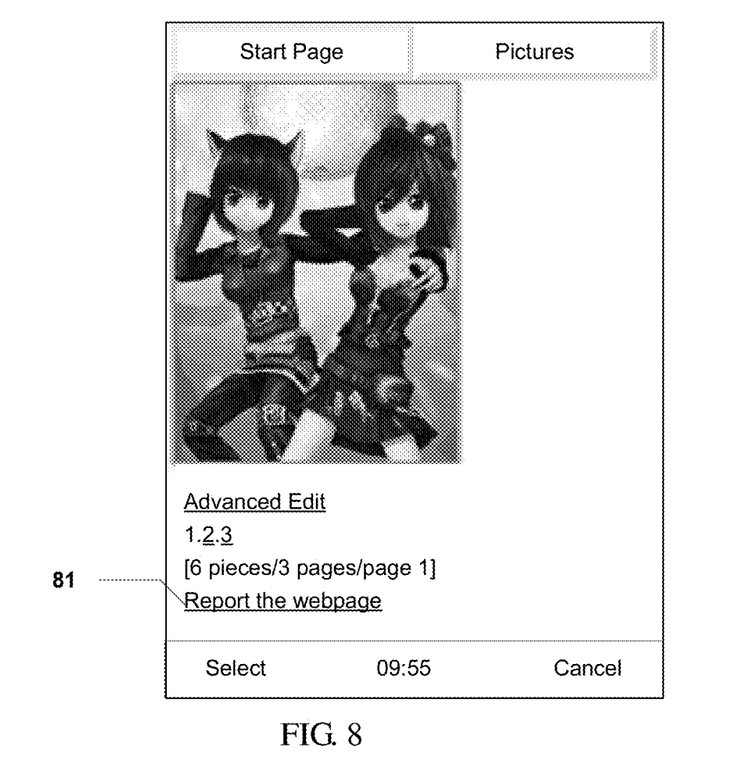
FIG. 8 is a schematic diagram showing another interface of a mobile terminal for providing the secure browsing service according to various embodiments.

FIG. 8 is a schematic diagram showing an interface of a mobile terminal for providing a secure browsing service according to various embodiments.

As shown in FIG. 8, the icon "report the webpage" (icon 81) on the interface is used for starting the reporting module 701 to report information about the webpage to the security server.

The mobile terminal includes a downloading module, adapted to download a file. The reporting module 701 is adapted to obtain characteristic code information of the file downloaded by the downloading module, and transmit the characteristic code information to the security server.

The security prompting module 702 is adapted to receive the security indication returned by the security server regarding the characteristic code information, and provide a security prompt for the file according to the security indication.

Figure 9:
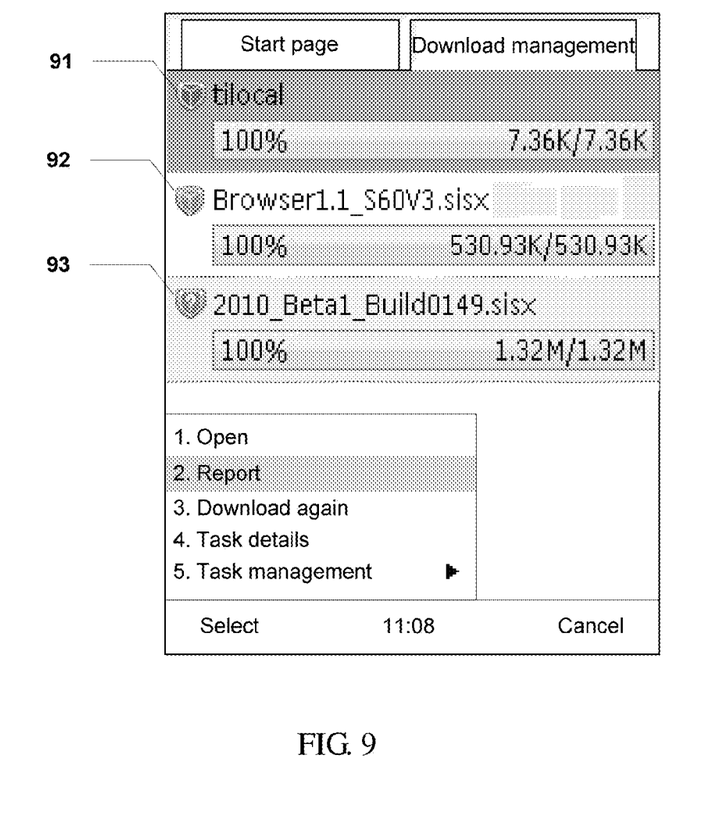
FIG. 9 is a schematic diagram showing an interface of a mobile terminal for providing a secure downloading service according to various embodiments.

FIG. 9 is a schematic diagram showing an interface of a mobile terminal for providing a secure downloading service according to various embodiments.

As shown in FIG. 9, the file on the first line is checked and determined to be unsafe. Therefore, a shield is displayed (icon 91 in FIG. 9) and the file is displayed in shade mode indicating that the file is unsafe. The file on the second line is checked and determined to be safe. Therefore, a shield is displayed indicating that the file is safe (icon 92 in FIG. 9). The file on the third line is not checked. Therefore, a shield with a question mark is displayed (icon 93 in FIG. 9), indicating that the security is unknown.

In addition, the "Report" icon on the downloading interface in FIG. 9 is used for starting the reporting module 701 to report information about the downloaded file to the security server.

Figure 10:
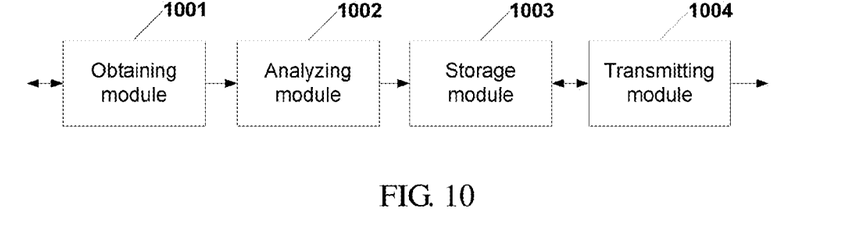
FIG. 10 is a schematic diagram illustrating a structure of a security server for improving security level of a mobile terminal when the terminal surfs the Internet according to various embodiments.

FIG. 10 is a schematic diagram illustrating a structure of a security server for improving security level of a mobile terminal when the mobile terminal surfs the Internet according to various embodiments. As shown in FIG. 10, the security server includes an obtaining module 1001, an analyzing module 1002, a storage module 1003 and a transmitting module 1004.

The obtaining module 1001 receives network security information reported by the mobile terminal.

The analyzing module 1002 analyzes the network security information obtained by the obtaining module, and generate network security policy according to the analyzed result.

The storage module 1003 stores the network security policy.

The transmitting module 1004 transmits a security indication to the mobile terminal 602 according to the network security policy.

The obtaining module 1001 further obtains website visiting information and/or file downloading information, and/or stores security list information of the website and the characteristic code of the file.

Various embodiments provide cloud security solutions based on browsers of mobile phones. A large amount of security plug-ins communicate with the security server through the browsers. A cloud security architecture is formed, which greatly improves the security level of the browser of the cell phone, avoids security problems brought by visiting malicious websites or downloading unsafe applications.

Various embodiments mainly provide the secure browsing service and the secure downloading service for the browser of the cell phone.

As to the secure browsing service, the malicious websites, fake webpages and phishing websites which have security problems may be blocked.

As to the secure downloading service, a security prompt may be displayed when the file is downloaded to provide security protection.

Compared with conventional solutions which improve security level through downloading a virus library locally, various embodiments have the following various advantages.

One various advantage is the thin client mode. The mobile terminal does not need to maintain a large virus library, which reduces the computing and storage load of the mobile terminal, saves user's resources and is applicable for more terminals.

A further various advantage is the high security level. Based on the cloud security service, information is collected, analyzed and processed in real-time. The more the number of the mobile terminals, the safer the entire cloud.

Another various advantage is the automatic policy determining. The network side automatically generates the network security policy according to the security data reported by the mobile terminal, which greatly increases the updating speed of the virus and saves human labor.

Yet another various advantage is being more timely. Conventional local virus library querying manner relies heavily on maintaining and updating speed of the virus library, and thus has a time delay. The cloud security architecture provides a real-time capability for obtaining the security service. The real-time feature may prevent wide spread of the virus and reduce affections of the virus.

In addition, the browser of the mobile terminal adopts a plug-in to realize the cloud security service, which has the following merits.

One merit is that it is more flexible: the security policy may be updated rapidly through updating the plug-in according to the needs.

Another merit is the higher security level: the plug-in also has a security protection mechanism, which avoids malicious attacks to the security plug-in of the browser. Thus, the security level is improved.

The installation package size of the browser is not increased. The user may customize browser services according to their needs.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for improving security level of a terminal when the terminal surfs the Internet, comprising:
   receiving, by a network side, characteristic code information of a file reported by the terminal, wherein the characteristic code information of the file is collected by the terminal using a first collecting algorithm;
   comparing, by the network side, the characteristic code information reported by the terminal with a characteristic code of a safe file, and comparing the characteristic code information reported by the terminal with a characteristic code of an unsafe file,
   if compared results conflict with each other, transmitting an indication to the terminal indicating the terminal to collect the characteristic code information of the file again, wherein if the characteristic code information of the file matches both the characteristic code of the safe file and the characteristic code of the unsafe file, the compared results conflict with each other;
   otherwise, generating a network security policy, and transmitting a security indication according to the network security policy to the terminal such that the terminal provides a security prompt for the file according to the security indication;
   the method further comprising:
   the terminal receiving a first website address inputted by a user, displaying locally-stored relevant addresses which are obtained through a fuzzy matching according to the first website address inputted by the user; comparing the relevant addresses with addresses in a black list and/or white list; for each of the relevant addresses, displaying a safe icon if the relevant address matches an address in the white list;
   wherein the indication transmitted by the network side to the terminal indicates a second collecting algorithm, wherein the terminal collects the characteristic code information of the file using the second collecting algorithm indicated by the network side, wherein the terminal collects the characteristic code of a first part of the file according to the first collecting algorithm and collects the characteristic code of a second part of the file according to the second collecting algorithm, the first part is different from the second part.

2. The method of claim 1, further comprising:
   the terminal transmitting a second website address to be checked to the network side in real-time, the network side checking the second website address according to the network security policy and returning the security indication to the terminal according to a checked result;
   the second website address to be checked comprises: a website address of a link in a webpage currently browsed by the terminal.

3. A system for improving security level of a terminal when the terminal surfs the Internet, comprising: a security server and a hardware terminal;
   the security server is adapted to receive characteristic code information of a file reported by the hardware terminal, wherein the characteristic code information of the file is collected by the hardware terminal using a first collecting algorithm, compare the characteristic code information reported by the hardware terminal with a characteristic code of a safe file, and compare the characteristic code information reported by the hardware terminal with a characteristic code of an unsafe file, if compared results conflict with each other, transmit an indication to the hardware terminal indicating the hardware terminal to collect the characteristic code information of the file again; otherwise, generate a network security policy, and transmit a security indication to the hardware terminal according to the network security policy, wherein if the characteristic code information of the file matches both the characteristic code of the safe file and the characteristic code of the unsafe file, the compared results conflict with each other; and
   the hardware terminal is adapted to receive the security indication transmitted by the security server, provide a security prompt for the file according to the security indication; the hardware terminal is further to receive a first website address inputted by a user, display locally-stored relevant addresses which are obtained through a fuzzy matching according to the first website address inputted by the user; compare the relevant addresses with addresses in a black list and/or white list; and for each of the relevant addresses, display a safe icon if the relevant address matches an address in the white list;
   wherein the indication transmitted by the security server to the hardware terminal indicates a second collecting algorithm, wherein the hardware terminal collects the characteristic code information of the file using the second collecting algorithm indicated by the security server, wherein the hardware terminal collects the characteristic code of a first part of the file according to the first collecting algorithm and collects the characteristic code of a second part of the file according to the second collecting algorithm, the first part is different from the second part.

4. The system of claim 3, wherein the hardware terminal comprises a plug-in platform, the plug-in platform comprises an interface for installing a network security plug-in; the network security plug-in is adapted to report the characteristic code information to the security server, and provide the security prompt for the file according to the security indication returned by the security server.

5. The system of claim 4, wherein the hardware terminal comprises a processor and a memory; wherein a browsing module is stored in the memory and executable by the processor;
  the browsing module is adapted to receive the first website address and browse a webpage;
  the network security plug-in is adapted to obtain the black list and/or white list from the security server and store the black list and/or white list, compare the first website address received by the browsing module and/or a second website address of a link in a currently browsed webpage with security information of the black list and/or white list, and display the security prompt according to a compared result;
  the security server comprises a first module, adapted to generate the black list and/or white list.

6. The system of claim 5, wherein the network security plug-in further comprises a module, adapted to transmit, if the second website address to be checked does not match the security information of the black list and/or white list, the second website address to be checked to the security server, and provide the security prompt for the file according to a checked result returned by the security server;
  the security server comprises a second module, adapted to check the second website address to be checked according to the network security policy, and transmit the checked result to the network security plug-in.

7. A terminal, comprising: a processor and a memory; wherein one or more program modules stored in the memory and to be executed by the processor, the one or more program modules comprise: a downloading module, a reporting module and a security prompting module; wherein
  the downloading module is adapted to download a file;
  the reporting module is adapted to obtain characteristic code information of the file downloaded by the downloading module using a first collecting algorithm, and report the characteristic code information of the file to a security server, such that the security server compares the characteristic code information reported by the reporting module with a characteristic code of a safe file, and compares the characteristic code information reported by the reporting module with a characteristic code of an unsafe file, if compared results conflict with each other, the security server transmits an indication to the terminal indicating the terminal to collect the characteristic code information of the file again, and generate a network security policy and transmits a security indication to the hardware terminal according to the network security policy if otherwise, wherein if the characteristic code information of the file matches both the characteristic code of the safe file and the characteristic code of the unsafe file, the compared results conflict with each other; and
  the security prompting module is adapted to receive the security indication returned by the security server, and provide a security prompt for the file according to the security indication;
  wherein the security prompting module is further adapted to receive a first website address inputted by a user, display locally-stored relevant addresses which are obtained through a fuzzy matching according to the first website address inputted by the user, compare the relevant addresses with addresses in a black list and/or white list; and for each of the relevant addresses, display a safe icon if the relevant address matches an address in the white list;
  wherein the indication transmitted by the network side to the terminal indicates a second collecting algorithm, wherein the terminal collects the characteristic code information of the file using the second collecting algorithm indicated by the network side, wherein the terminal collects the characteristic code of a first part of the file according to the first collecting algorithm and collects the characteristic code of a second part of the file according to the second collecting algorithm, the first part is different from the second part.

8. The terminal of claim 7, wherein the terminal comprises a plug-in platform, the plug-in platform comprises an interface for installing a network security plug-in, the network security plug-in comprises the downloading module, the reporting module and the security prompting module.

9. The terminal of claim 8, wherein the security prompting module is adapted to obtain the black list and/or white list from the security server and store the black list and/or white list, compare the first website address received by the terminal and/or a second website address of a link in a currently browsed webpage with security information in the black list and/or white list, and display the security prompt according to a compared result.

10. The terminal of claim 9, wherein the security prompting module further comprises a module, adapted to transmit, if the second website address to be checked does not match the security information of the black list and/or white list, the second website address to be checked to the security server, and provide the security prompt for the network information to be obtained or having been obtained according to a check result returned by the security server.

* * * * *